US009361015B2

(12) United States Patent
Chen

(10) Patent No.: US 9,361,015 B2
(45) Date of Patent: Jun. 7, 2016

(54) DISPLAY APPARATUSES AND ELECTRONIC DEVICES

(71) Applicants: Lenovo (Beijing) Limited, Beijing (CN); Beijing Lenovo Software Ltd., Beijing (CN)

(72) Inventor: Yingbiao Chen, Beijing (CN)

(73) Assignees: Lenovo (Beijing) Limited, Beijing (CN); Beijing Lenovo Software, Ltd., Beijing (CN)

( * ) Notice: Subject to any disclaimer, the term of this patent is extended or adjusted under 35 U.S.C. 154(b) by 212 days.

(21) Appl. No.: 13/672,890

(22) Filed: Nov. 9, 2012

(65) Prior Publication Data

US 2013/0127751 A1    May 23, 2013

(30) Foreign Application Priority Data

Nov. 11, 2011    (CN) .......................... 2011 1 0358175

(51) Int. Cl.
*G06F 3/0488* (2013.01)
*G02F 1/1343* (2006.01)
*G06F 3/041* (2006.01)
*G06F 3/044* (2006.01)

(52) U.S. Cl.
CPC ........ *G06F 3/0488* (2013.01); *G02F 1/134336* (2013.01); *G06F 3/044* (2013.01); *G06F 3/0412* (2013.01)

(58) Field of Classification Search
CPC . G02F 1/134336; G06F 3/0412; G06F 3/044; G06F 3/0488; G09G 3/20
USPC .................................................. 345/173, 76
See application file for complete search history.

(56) References Cited

U.S. PATENT DOCUMENTS

| | | | |
|---|---|---|---|
| 2003/0030602 A1* | 2/2003 | Kasai | 345/76 |
| 2004/0150629 A1* | 8/2004 | Lee | 345/173 |
| 2007/0057257 A1* | 3/2007 | Kim | 257/59 |
| 2008/0314652 A1 | 12/2008 | Kim et al. | |
| 2010/0002180 A1* | 1/2010 | Kim et al. | 349/143 |
| 2010/0231548 A1 | 9/2010 | Mangione-Smith et al. | |
| 2011/0109568 A1* | 5/2011 | Wu et al. | 345/173 |
| 2011/0149375 A1 | 6/2011 | Kothari et al. | |
| 2011/0273397 A1 | 11/2011 | Hanari | |
| 2013/0181923 A1* | 7/2013 | Chen et al. | 345/173 |

FOREIGN PATENT DOCUMENTS

CN        1936811 A        3/2007

* cited by examiner

*Primary Examiner* — Quan-Zhen Wang
*Assistant Examiner* — Tony Davis
(74) *Attorney, Agent, or Firm* — Kinney & Lange, P.A.

(57) ABSTRACT

Disclosed are display apparatuses and electronic devices including the same. The display apparatus includes a first driving layer, a second driving layer, a display layer arranged between the first and second driving layers, and a first processing unit. The display apparatus further includes a detection unit and a second processing unit. The display apparatus and the electronic device are configured to enable touch operation function with the structure of a common display apparatus, without incorporating any additional touch sensing layer. This reduces manufacture cost, and meets the requirement of a thinner and lighter display.

2 Claims, 4 Drawing Sheets

DISPLAY APPARATUSES AND ELECTRONIC DEVICES

TECHNICAL FIELD

The present disclosure relates to electronic device technologies, and in particular to display apparatuses having a touch operation function and electronic devices using such display apparatuses.

BACKGROUND

To improve convenience in use for users of electronic devices, a growing number of electronic devices, such as mobile phones, PDAs, ATMs and laptops, have adopted touch control technology for operation input.

Conventional touch display screens require an additional touch sensing layer or a touch function supporting panel which is usually arranged on the surface of the screen. Although a touch operation function is enabled, these techniques lead to a thicker and heavier display screen which goes against the requirement of becoming thinner and lighter. These techniques also require additional materials and thus cause cost increase and resource waste.

SUMMARY

An object of the present disclosure is to provide a display apparatus and an electronic device capable of supporting a touch operation function with the structure of a common display apparatus, without adding an additional touch sensing layer.

According to an aspect of embodiments of the present disclosure, a display apparatus is provided comprising:

a first driving layer comprising a plurality of first scan lines in parallel, each first scan line having a first projection line in a first plane, the first driving layer being parallel to the first plane;

a second driving layer arranged in parallel to the first driving layer and comprising a plurality of second scan lines in parallel, each second scan line having a second projection line in the first plane, wherein the first projection lines and the second projection lines intersects with each other to form a grid;

a display layer arranged between the first and second driving layers and comprising a plurality of display units, each display unit having a first state and a second state different from the first state, wherein each of the display units has a respective one of the first scan lines and a respective one of the second scan lines, and changes from the first state to the second state in response to a voltage difference between the respective ones of the first and second scan lines;

a first processing unit configured to, based on a content to be displayed, input a voltage to the first and second scan lines to cause at least one of the display units of the display layer to change from the first state to the second state;

a detection unit configured to detect a change in voltage and/or current of each of the first and second scan lines; and a second processing unit configured to, based on a result of the detection, take one of the first scan line having a change in voltage and/or current as a first contact lines, take one of the second scan lines having a change in voltage and/or current as a second contact line, determine an intersection between the projection lines of the first and second contact lines in the first plane, and take the intersection as a touch position at which an operator touches the display apparatus.

According to another aspect of embodiments of the present disclosure, an electronic device is provided comprising:

a first driving layer comprising a plurality of first scan lines in parallel, each first scan line having a first projection line in a first plane, the first driving layer being parallel to the first plane;

a second driving layer arranged in parallel to the first driving layer and comprising a plurality of second scan lines in parallel, each second scan line having a second projection line in the first plane, wherein the first projection lines and the second projection lines intersects with each other to form a grid;

a display layer arranged between the first and second driving layers and comprising a plurality of display units, each display unit having a first state and a second state different from the first state, wherein each of the display units has a respective one of the first scan line and a respective one of the second scan line, and changes from the first state to the second state in response to a voltage difference between the respective ones of the first and second scan lines;

a first processing unit configured to, based on a content to be displayed, input a voltage to the first and second scan lines to cause at least one of the display units of the display layer to change from the first state to the second state;

a detection unit configured to detect a change in voltage and/or current of each of the first and second scan lines;

a second processing unit configured to, based on a result of the detection, take one of the first scan line having a change in voltage and/or current as a first contact line, take one of the second scan line having a change in voltage and/or current as a second contact line, determine an intersection between the projection lines of the first and second contact lines in the first plane, and take the intersection as a touch position at which an operator touches the electronic device; and a responding unit configured to perform a touch operation corresponding to the touch position in response to the touch of the operator.

According to a further aspect of embodiments of the present disclosure, a display apparatus is provided comprising:

a display layer configured to display image information and comprising a plurality of display units;

a driving unit comprising first scan lines and second scan lines arranged in different layers;

a first processing unit configured to, based on a content to be displayed, input a voltage to the first and second scan lines to cause a change in state of at least one of the display units of the display layer; and a second processing unit configured to determine a touch position at which an operator touches the display apparatus by utilizing a change in voltage and/or current of the first and second scan lines due to the touch operation of the operator.

According to a still further aspect of embodiments of the present disclosure, an electronic device is provided comprising:

a display layer configured to display image information and comprising a plurality of display units;

a driving unit comprising first scan lines and second scan lines arranged in different layers;

a first processing unit configured to, based on a content to be displayed, input a voltage to the first and second scan lines to cause a change in state of at least one of the display units of the display layer;

a second processing unit configured to determine a touch position at which an operator touches the electronic device by utilizing a change in voltage and/or current of the first and second scan lines due to the touch of the operator; and a responding unit configured to perform a touch operation corresponding to the touch position in response to the touch of the operator.

Embodiments of the present disclosure have at least the following advantages. With the structure of the first and second scan lines for achieving change in display state of the display units in the display apparatus, when the operator approaches a point on the display apparatus, change in voltage and/or current occurs in a circuit formed by the first and second scan lines at the point due to the capacitance caused by the operator. The location of the point can be determined by detecting the change in voltage and/or current.

The display apparatus and the electronic device according to embodiments of the present disclosure enables the touch operation function with the structure of a common display apparatus, without incorporating any additional touch sensing layer. This reduces manufacture cost, and meets the requirement of a thinner and lighter display.

DETAILED DESCRIPTION OF THE PREFERRED EMBODIMENTS

The above objects, solutions and advantages of the present disclosure will be more apparent from the following detailed description of embodiments in conjunction with accompanying drawings.

In display apparatuses and electronic devices according to embodiments of the present disclosure, first and second scan lines are utilized to enable change in display state of display units, for example, deflection of liquid crystal molecules in the case of a liquid crystal display. When an operator approaches a circuit formed by the first and second scan lines, part of current in the circuit flows away due to effect of a capacitance by the operator, thereby causing change in voltage and/or current occurs on the first and second scan lines. The location of a touch point by the operator can be determined by detecting the change in voltage and/or current. In this way, it enables the display apparatus to support a touch operation function, without any additional touch sensing layer.

A display apparatus according to an embodiment of the present disclosure may include a display layer configured to display image information and comprising a plurality of display units, a driving unit comprising first scan lines and second scan lines arranged in different layers, a first processing unit and a second processing unit. The first processing unit may be configured to, based on a content to be displayed, input a voltage to the first and second scan lines to cause a change in state of at least one of the display units of the display layer. The second processing unit may be configured to determine a touch position at which an operator touches the display apparatus by utilizing a change in voltage and/or current of the first and second scan lines due to the touch operation of the operator.

Figure 1:
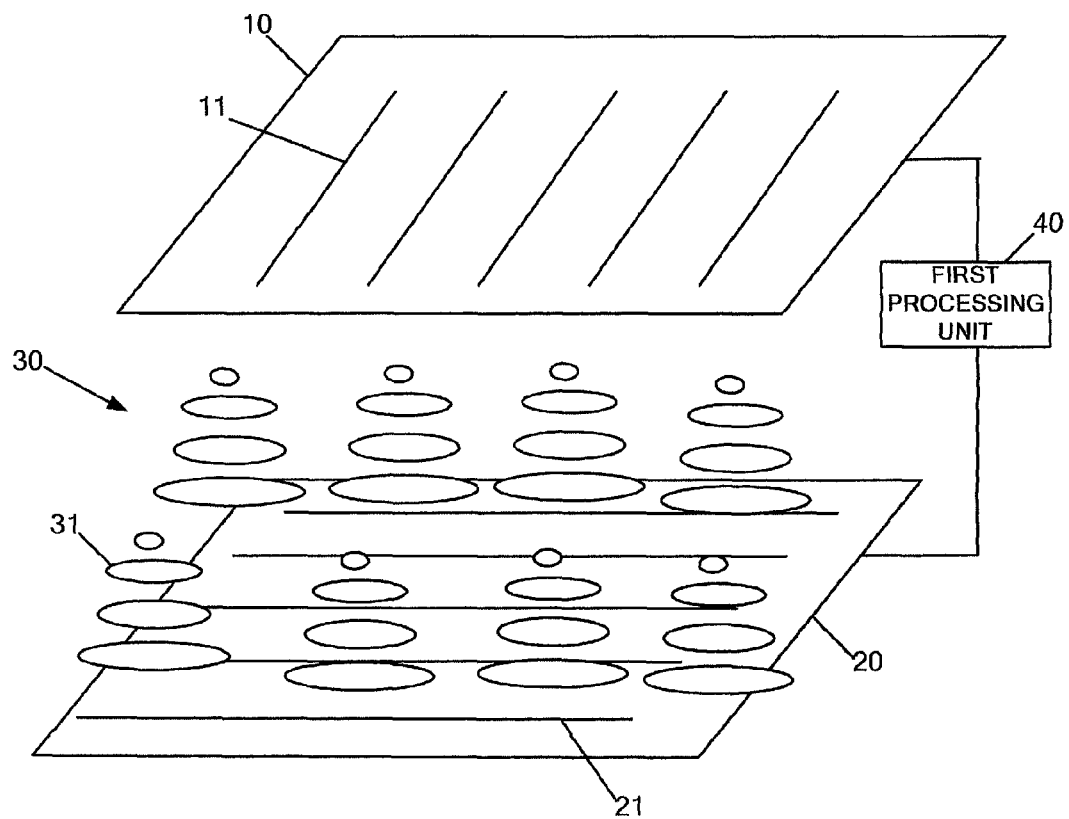
FIG. 1 shows a schematic block diagram of a prior art display apparatus.

FIG. 1 shows a schematic block diagram of a prior art display apparatus without a touch operation function. The display apparatus shown in FIG. 1 may include a first driving layer 10, a second driving layer 20, a display layer 30 and a first processing layer 40. The first driving layer 10 may include a plurality of first scan lines 11 in parallel. Each of the first scan lines may have a first projection line in a first plane. The first driving layer 10 may be parallel to the first plane. The second driving layer 20 may be arranged in parallel to the first driving layer 10, and include a plurality of second scan lines 21 in parallel. Each of the second scan lines 21 may have a second projection line in the first plane. The first projection lines and the second projection lines may intersect with each other to form a grid. The display layer 30 may be arranged between the first and second driving layers 10 and 20, and include a plurality of display units 31. Each display unit 31 may have a first state and a second state different from the first state. Each of the display units 31 may have a respective one of the first scan lines 11 and a respective one of the second scan lines 21, and change from the first state to the second state in response to a voltage difference between the respective ones of the first and second scan lines 11 and 21. The first processing unit 40 may be configured to, based on a content to be displayed, input a voltage to the first and second scan lines 11 and 21 to cause at least one of the display units 31 of the display layer 30 to change from the first state to the second state.

With the above structure, the prior art display apparatus enables state change of the display units 31 of the display layer 30, thereby resulting in change in displayed content. The first plane parallel to the first and second driving layers 10 and 20 may be a virtual plane which is intended to explain a spatial structure formed by intersection of the first and second scan lines 11 and 21. When projected to the first plane, the first and second scan lines 11 and 21 intersects with each other to form a grid. Each of the display units 31 of the display layer 30 is generally located at the spatial intersection between one of the first scan lines 11 and one of the second scan lines 21.

The above display apparatus may be a liquid crystal display including a plurality of liquid crystal molecules. Each liquid crystal molecule may be located at the spatial intersection between one of the first scan lines 11 and one of the second scan lines 21. When the first and second scan line 11 and 21 are applied with different voltages, the liquid crystal molecule will be deflected due to a voltage difference. Accordingly, light transmittance of the display layer will change, thereby resulting in change in display state of the display apparatus.

The above display apparatus may be a plasma display, and the display unit 31 may include a plurality of plasmas each of which may be located at the spatial intersection between one of the first scan lines 11 and one of the second scan lines 21. When the first scan line 11 is applied with a higher voltage, and the second scan line 21 is applied with a lower voltage, the voltage difference will cause the plasma at the intersection to emit light through breakdown and discharge, thereby resulting in change in display state of the display apparatus.

In view of the prior art display apparatus, embodiments of the present disclosure utilize the structure of the first and second scan lines 11 and 21. In fact, when an operator approaches a point on the display apparatus, change in voltage and/or current occurs in a circuit formed by the first and second scan lines 11 and 21 at the point due to the capacitance caused by the operator. In this way, it is possible to determine the location of the point by detecting the change in voltage and/or current.

Figure 2:
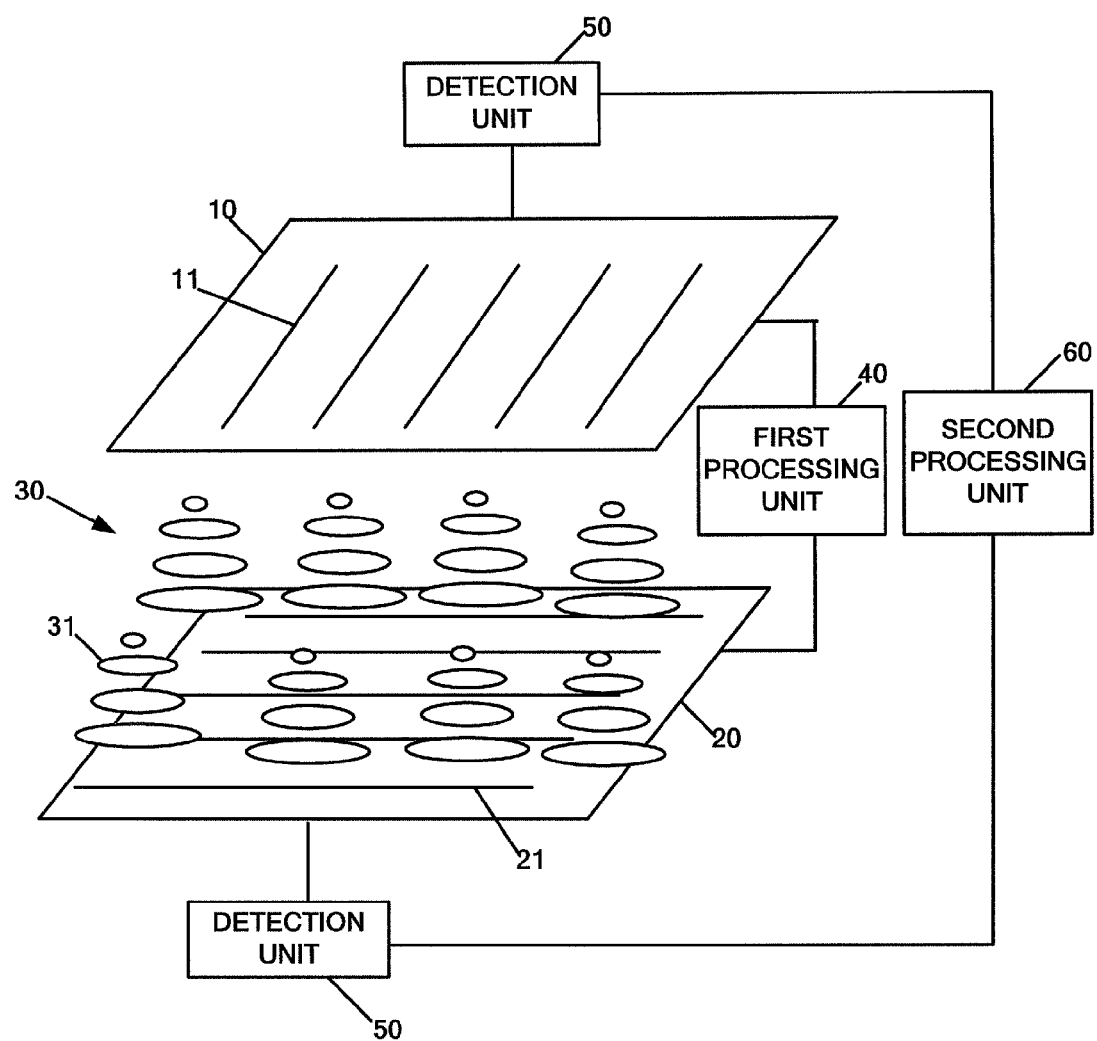
FIG. 2 shows a schematic block diagram of a display apparatus according to an embodiment of the present disclosure.

In addition to the components shown in FIG. 1, a display apparatus according to an embodiment of the present disclosure may further includes a detection unit 50 and a second processing unit 60 as shown in FIG. 2. The detection unit 50 may be configured to detect a change in voltage and/or current of each of the first and second scan lines. The second processing unit 60 may be configured to, based on a result of the detection, take one of the first scan lines 11 having a change in voltage and/or current as a first contact line, take one of the second scan lines 21 having a change in voltage and/or current as a second contact line, determine an intersection between the projection lines of the first and second contact lines in the first plane, and take the intersection as a touch position at which an operator touches the display apparatus.

The display apparatus according to the embodiment of the present disclosure of FIG. 2 enables the touch operation function with the structure of a common display apparatus, without incorporating any additional touch sensing layer. This reduces manufacture cost, and meets the requirement of a thinner and lighter display.

Hereafter, detailed description will be made on determining a contact position of an operator on the display apparatus by detecting a change in voltage and/or current of each of the first and second scan lines in accordance with an embodiment of the present disclosure.

Figure 3:
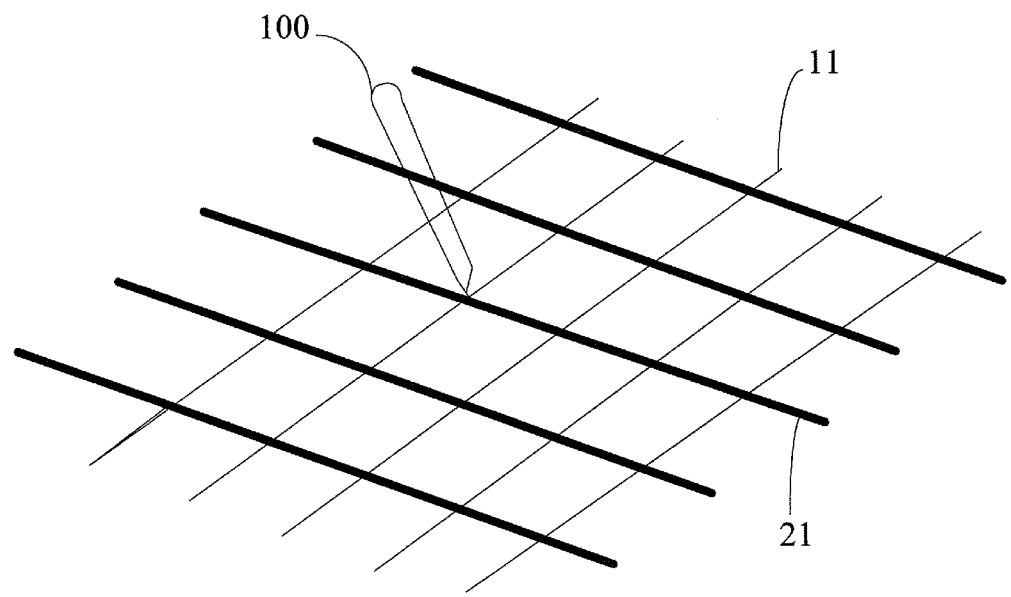
FIG. 3 is a schematic diagram showing the schematic diagram for touch operation in the display apparatus according to an embodiment of the present disclosure.

The display apparatus may be a liquid crystal display, for example. FIG. 3 shows the schematic diagram for detecting a touch operation with the first and second scan lines 11 and 21. When the operator does not perform a touch operation on the display apparatus, and voltages applied to an individual one of the first scan lines 11 and an individual one of the second scan lines 21 are fixed, currents on the individual first scan line 11 and the individual second scan line 21 will be stable, that is, the currents flowing through the first and second scan lines 11 and 21 are equal.

When the operator touches a point on the display apparatus, and the spatial location of the point is at the intersection of the corresponding first and second scan lines 11 and 21, the operator will introduce a capacitance, and thus a small amount of current will be shunt aside. This causes currents on the first and second scan lines 11 and 21 to become unequal.

According to the above schematic diagram, the detection unit 50 may perform detection in the following first manner in the display apparatus of the embodiment of the present disclosure.

The detection unit 50 may select one of the first scan lines 11, and detect a current difference between the selected first scan line 11 and each of the second scan lines 21. The detection unit 50 may successively select the first scan lines 11, and detect the current difference between the selected one and each of the second scan lines 21.

The detection unit 50 may also select one of the second scan lines 21, and detect a current difference between the selected second scan line 21 and each of the first scan lines 11. The detection unit 50 may successively select the second scan lines 21, and detect the current difference between the selected one and each of the first scan lines 11.

The detection unit 50 may set a first scan line 11 as a first contact line if the first scan line 11 has a nonzero current difference with respect to each of the second scan lines 21.

The detection unit 50 may set a second scan line 21 as a second contact line if the second scan line 21 has a nonzero current difference with respect to each of the first scan lines 11.

The first and second contact lines are, among the first and second scan lines, those having a change in current due to the effect of the capacitance caused by the touch of the operator on the display apparatus. The position of the operator's touch on the display apparatus may be determined based on the coordinates of the intersection between the first and second contact lines.

The detection unit may detect, sequentially and at a certain frequency, current differences between the respective first scan lines and the respective second scan lines in the above manner, and information of the position of the operator's touch on the display apparatus can be obtained.

Turning again to FIG. 3, when the operator does not perform a touch operation on the display apparatus, and voltages applied to an individual one of the first scan lines 11 and an individual one of the second scan lines 21 are fixed, currents on the individual first scan line 11 and the individual second scan line 21 will be stable, that is, reference currents.

When the operator touches a point on the display apparatus, and the spatial location of the point is at the intersection of the corresponding first and second scan lines 11 and 21, the operator will introduce a capacitance, and thus a small amount of current will be shunt aside. This causes currents on the first and second scan lines 11 and 21 to become different from the reference currents, respectively.

According to the above schematic diagram, the detection unit 50 may perform detection in the following second manner in the display apparatus of the embodiment of the present disclosure.

The detection unit 50 may determine a first reference current for each of the first scan lines 11 with respect to the respective second scan lines 21, and determine a second reference current for each of the second scan lines 21 with respect to the respective first scan lines 11.

The detection unit 50 may detect a first current on each of the first scan lines 11 with respect to the respective second scan lines 21, and set the first scan line 11 as the first contact line, when the first current on the first scan line 11 is different from the corresponding first reference current.

The detection unit 50 may detect a second current on each of the second scan lines 21 with respect to the respective first scan lines 11, and set the second scan line 21 as the second contact line, when the second current on the second scan line 21 is different from the corresponding second reference current.

For a set of first and second scan lines 11 and 21 arranged as spatially intersecting with each other, when there is no touch operation, and the voltages applied to the first and second scan lines 11 and 21 are fixed, the currents on the first and second scan lines 11 and 21 are equal, that is, the first and second reference currents are equal. If the first current detected on the first scan line 11 increases with respect to the first reference current, the second current detected on the corresponding second scan line 21 will decrease with respect to the second reference current.

The detection unit may detect, sequentially and at a certain frequency, currents on the respective first scan lines and the respective second scan lines and compare the detected currents with the reference current in the above manner. The first and second scan lines having currents changed from the reference currents may be set as the first and second contact lines, respectively, which corresponds to the point of the operator's touch on the display apparatus. In this way, information of the position of the operator's touch on the display apparatus can be obtained.

The above methods of touch detection can support multi-point touch operation. The maximal number of touch points may be as large as the number of the spatial intersections between the first and second scan lines.

Figure 4:
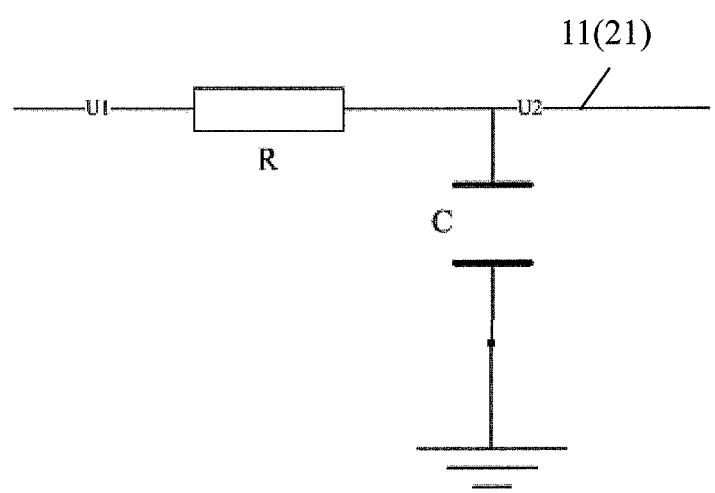
FIG. 4 is a schematic circuit diagram showing influence on current or voltage of a first or second scan line from a touch operation by an operator on the display apparatus according to an embodiment of the present disclosure.

FIG. 4 is a schematic circuit diagram showing influence on current or voltage of a first or second scan line 11 and 21 from a touch operation by an operator on the display apparatus according to an embodiment of the present disclosure.

As shown in FIG. 4, the first and second scan lines 11 and 21 each may be equivalent to a circuit having a resistance R. When the operator does not touch the display apparatus or the first or second scan lines 11 or 21, the circuit including the resistance R has a stable waveform.

When the operator touches a point on the display apparatus shown as U2 on the first or second scan lines 11 or 21 in FIG. 4, a capacitance C is introduced at U2 by which a small amount of current is shunt aside. This will cause a difference between voltage waveforms at both ends (U1 and U2) of the resistance R.

As shown in FIG. 4, a voltage at U2 is measured while a voltage U is applied at U1 on the first or second scan lines 11 or 21. If the increase in the voltage at U2 has a noticeable delay in time, it may be determined that the first or second scan lines 11 or 21 is affected by the operator's touch.

According to the above, the detection unit 50 may perform detection in the following third manner in the display apparatus of the embodiment of the present disclosure.

The detection unit 50 may obtain an input time at which the voltage is inputted to the first and second scan lines 11 and 21, detect, for each of the first scan lines 11, a first time at which a point on the first scan line 11 reaches the input voltage, and detect, for each of the second scan lines 21, a second time at which a point on the second scan line 21 reaches the input voltage.

The detection unit 50 may set the first scan line 11 as the first contact line if a difference between the first time corresponding to the first scan line 11 and the input time is greater than a first predetermined time value. The detection unit 50 may set the second scan line 21 as the second contact line if a difference between the second time corresponding to the second scan line 21 and the input time is greater than the first predetermined time value.

According to the above, the detection unit 50 may perform detection in the following fourth manner in the display apparatus of the embodiment of the present disclosure.

The detection unit 50 may detect a first current (or a first voltage) on each of the first scan lines 11, and record a first time at which the first current (or the first voltage) is detected.

The detection unit 50 may detect a second current (or a second voltage) on each of the second scan lines 21, and record a second time at which the second current (or the second voltage) is detected.

The detection unit 50 may set the first scan line 11 as the first contact line if a difference between the first time corresponding to the first scan line 11 and the second time corresponding to each of the second scan lines 21 is greater than a second predetermined time value.

The detection unit 50 may set the second scan line 21 as the second contact line if a difference between the second time corresponding to the second scan line 21 and the first time corresponding to each of the first scan lines 11 is greater than the second predetermined time value.

In the above, a difference between times at which the voltages or currents are detected on the first and second scan lines 11 and 21 is used to determine whether a fluctuation occurs in the voltages on the first and second scan lines 11 and 21, that is, whether there is a delay in the flowing of the currents. In this way, it is possible to determine whether the first and second scan lines 11 and 21 are contact lines touched by the operator.

The present disclosure is not limited to the foregoing four detection methods which are intended to be preferred embodiments of the present disclosure. It is apparent to a person skilled in the art that variations may be made to the present disclosure to detect change in voltage and/or current on the first and second scan lines 11 and 21 in other manners.

The above detection methods are described taking a liquid crystal display as example, while they are applicable to other types of display apparatuses, such as plasma displays.

Another embodiment of the present disclosure provides an electronic device including the above display apparatus. The electronic device includes a display layer configured to display image information and comprising a plurality of display units, a driving unit comprising first scan lines and second scan lines arranged in different layers, a first processing unit configured to, based on a content to be displayed, input a voltage to the first and second scan lines to cause a change in state of at least one of the display units of the display layer, a second processing unit configured to determine a touch position at which an operator touches the electronic device by utilizing a change in voltage and/or current of the first and second scan lines due to the touch of the operator, and a responding unit configured to perform a touch operation corresponding to the touch position in response to the touch of the operator.

With reference to FIG. 2 showing the display apparatus, the electronic device may particularly include a first driving layer 10, a second driving layer 20, a display layer 30, a first processing layer 40, a detection unit 50 and a second processing unit 60. The first driving layer 10 may include a plurality of first scan lines 11 in parallel. Each of the first scan lines may have a first projection line in a first plane. The first driving layer 10 may be parallel to the first plane. The second driving layer 20 may be arranged in parallel to the first driving layer 10, and include a plurality of second scan lines 21 in parallel. Each of the second scan lines 21 may have a second projection line in the first plane. The first projection lines and the second projection lines may intersect with each other to form a grid. The display layer 30 may be arranged between the first and second driving layers 10 and 20, and include a plurality of display units 31. Each display unit 31 may have a first state and a second state different from the first state. Each of the display units 31 may have a to respective one of the first scan lines 11 and a respective one of the second scan lines 21, and change from the first state to the second state in response to a voltage difference between the respective ones of the first and second scan lines 11 and 21. The first processing unit 40 may be configured to, based on a content to be displayed, input a voltage to the first and second scan lines 11 and 21 to cause at least one of the display units 31 of the display layer 30 to change from the first state to the second state. The detection unit 50 may be configured to detect a change in voltage and/or current of each of the first and second scan lines. The second processing unit 60 may be configured to, based on a result of the detection, take one of the first scan lines 11 having a change in voltage and/or current as a first contact line, take one of the second scan lines 21 having a change in voltage and/or current as a second contact line, determine an intersection between the projection lines of the first and second contact lines in the first plane, and take the intersection as a touch position at which an operator touches the display apparatus. The responding unit may perform a touch operation corresponding to the touch position in response to the touch of the operator.

In the electronic device according to the embodiment of the present disclosure, the detection unit 50 may perform the detection in the first manner.

The detection unit 50 may select one of the first scan lines 11, and detect a current difference between the selected first scan line 11 and each of the second scan lines 21. The detection unit 50 may successively select the first scan lines 11, and detect the current difference between the selected one and each of the second scan lines 21.

The detection unit 50 may also select one of the second scan lines 21, and detect a current difference between the selected second scan line 21 and each of the first scan lines 11. The detection unit 50 may successively select the second scan lines 21, and detect the current difference between the selected one and each of the first scan lines 11.

The detection unit 50 may set a first scan line 11 as a first contact line if the first scan line 11 has a nonzero current difference with respect to each of the second scan lines 21.

The detection unit 50 may set a second scan line 21 as a second contact line if the second scan line 21 has a nonzero current difference with respect to each of the first scan lines 11.

The first and second contact lines are, among the first and second scan lines, those having a change in current due to the effect of the capacitance caused by the touch of the operator on the display apparatus. The position of the operator's touch on the display apparatus may be determined based on the coordinates of the intersection between the first and second contact lines.

The detection unit may detect, sequentially and at a certain frequency, current differences between the respective first scan lines and the respective second scan lines in the above manner, and information of the position of the operator's touch on the display apparatus can be obtained.

In the electronic device according to the embodiment of the present disclosure, the detection unit 50 may perform the detection in the second manner.

The detection unit 50 may determine a first reference current for each of the first scan lines 11 with respect to the respective second scan lines 21, and determine a second reference current for each of the second scan lines 21 with respect to the respective first scan lines 11.

The detection unit 50 may detect a first current on each of the first scan lines 11 with respect to the respective second scan lines 21, and set the first scan line 11 as the first contact line, when the first current on the first scan line 11 is different from the corresponding first reference current.

The detection unit 50 may detect a second current on each of the second scan lines 21 with respect to the respective first scan lines 11, and set the second scan line 21 as the second contact line, when the second current on the second scan line 21 is different from the corresponding second reference current.

For a set of first and second scan lines 11 and 21 arranged as spatially intersecting with each other, when there is no touch operation, and the voltages applied to the first and second scan lines 11 and 21 are fixed, the currents on the first and second scan lines 11 and 21 are equal, that is, the first and second reference currents are equal. If the first current detected on the first scan line 11 increases with respect to the first reference current, the second current detected on the corresponding second scan line 21 will decrease with respect to the second reference current.

The detection unit may detect, sequentially and at a certain frequency, currents on the respective first scan lines and the respective second scan lines and compare the detected currents with the reference currents in the above manner. The first and second scan lines having currents changed from the reference currents may be set as the first and second contact lines, respectively, which corresponds to the point of the operator's touch on the display apparatus. In this way, information of the position of the operator's touch on the display apparatus can be obtained.

The above methods of touch detection can support multi-point touch operation. The maximal number of touch points may be as large as the number of the spatial intersections between the first and second scan lines.

FIG. 4 shows a schematic circuit diagram illustrating influence on current or voltage of a first or second scan line 11 and 21 from a touch operation by an operator on the display apparatus according to an embodiment of the present disclosure.

As shown in FIG. 4, the first and second scan lines 11 and 21 each may be equivalent to a circuit having a resistance R. When the operator does not touch the display apparatus or the first or second scan lines 11 or 21, the circuit including the resistance R has a stable waveform.

When the operator touches a point on the display apparatus shown as U2 on the first or second scan lines 11 or 21 in FIG. 4, a capacitance C is introduced at U2 by which a small amount of current is shunt aside. This will cause a difference between voltage waveforms at both ends (U1 and U2) of the resistance R.

As shown in FIG. 4, a voltage at U2 is measured while a voltage U is applied at U1 on the first or second scan lines 11 or 21. If the increase in the voltage at U2 has a noticeable delay in time, it may be determined that the first or second scan lines 11 or 21 is affected by the operator's touch.

According to the above, the detection unit 50 may perform detection in the following third manner in the display apparatus of the embodiment of the present disclosure.

The detection unit 50 may obtain an input time at which the voltage is inputted to the first and second scan lines 11 and 21, detect, for each of the first scan lines 11, a first time at which a point on the first scan line 11 reaches the input voltage, and detect, for each of the second scan lines 21, a second time at which a point on the second scan line 21 reaches the input voltage.

The detection unit 50 may set the first scan line 11 as the first contact line if a difference between the first time corresponding to the first scan line 11 and the input time is greater than a first predetermined time value. The detection unit 50 may set the second scan line 21 as the second contact line if a difference between the second time corresponding to the second scan line 21 and the input time is greater than the first predetermined time value.

According to the above, the detection unit 50 may perform detection in the following fourth manner in the display apparatus of the embodiment of the present disclosure.

The detection unit 50 may detect a first current (or a first voltage) on each of the first scan lines 11, and record a first time at which the first current (or the first voltage) is detected.

The detection unit 50 may detect a second current (or a second voltage) on each of the second scan lines 21, and record a second time at which the second current (or the second voltage) is detected.

The detection unit 50 may set the first scan line 11 as the first contact line if a difference between the first time corresponding to the first scan line 11 and the second time corresponding to each of the second scan lines 21 is greater than a second predetermined time value.

The detection unit 50 may set the second scan line 21 as the second contact line if a difference between the second time corresponding to the second scan line 21 and the first time corresponding to each of the first scan lines 11 is greater than the second predetermined time value.

In the above, a difference between times at which the voltages or currents are detected on the first and second scan lines 11 and 21 is used to determine whether a fluctuation occurs in the voltages on the first and second scan lines 11 and 21, that is, whether there is a delay in the flowing of the currents. In this way, it is possible to determine whether the first and second scan lines 11 and 21 are contact lines touched by the operator.

When an operator performs a touch in the display apparatus and the electronic device, the location of the touch can be determined by detecting change in voltage or current of the first and second scan lines which are originally used for the display function. The detection unit may carry out the detection in any of the following manner.

Single-end detection of current: detecting whether a current in the first or second scan line is the same as a reference current;

Dual-end detection of current: detecting whether a difference between a current flowing from the second scan line and a current flowing into the first scan line is large;

Single-end detection of voltage: detecting whether a time when a voltage on the first or second scan line changes is the same as a reference time; and Dual-end detection of voltage: detecting whether a rising time of a voltage on the second scan line is the same as that on the first scan line.

Figure 5:
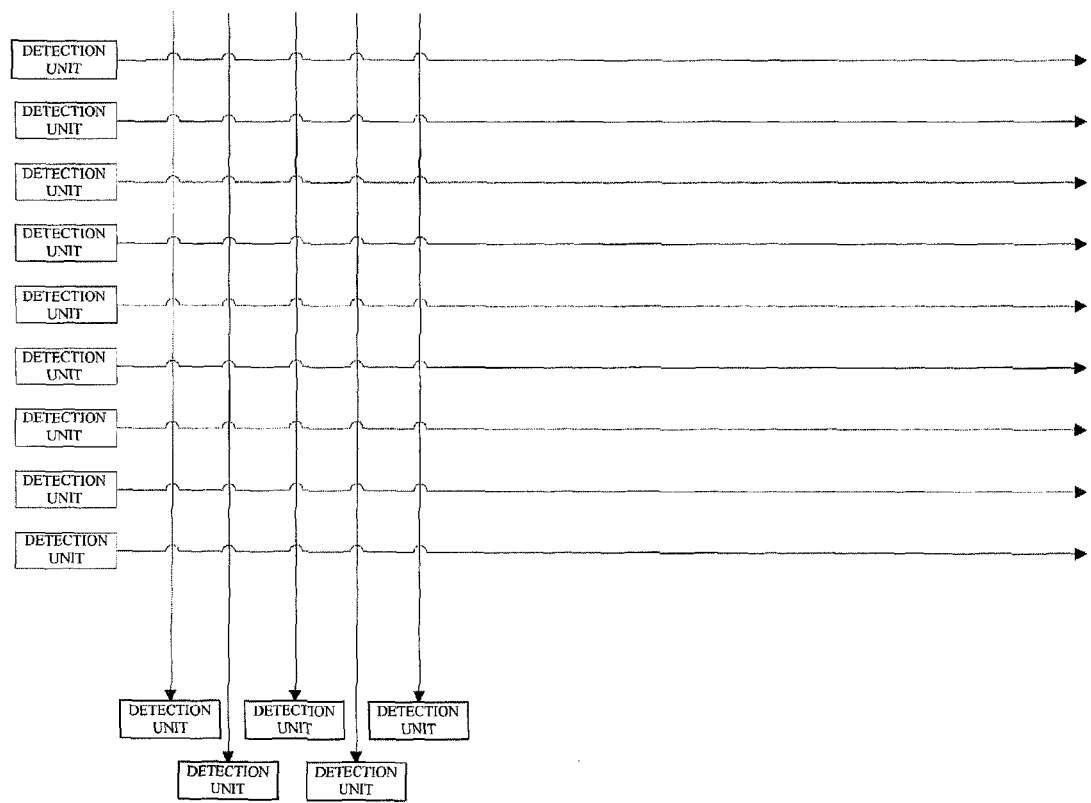
FIG. 5 is a schematic diagram showing arrangement of detection units in the display apparatus according to an embodiment of the present disclosure.

FIG. 5 shows an example of arrangement of detection units according to an embodiment of the present disclosure. The example of FIG. 5 is an arrangement of detection units in the case of Dual-end detection of current or voltage, where the detection units need to be provided to both the first and second scan lines. In the case of single-end detection, the detection units need to be provided to only one of the first and second scan line.

The second processing unit 60 of the display apparatus and the electronic device may perform computation and processing based on the result of detection by the detection units to obtain the location of the touch. The second processing unit 60 may support multi-point touch function. The display apparatus and the electronic device according to the embodiments of the present disclosure have the following advantages.

With the structure of the first and second scan lines for achieving change in display state of the display units in the display apparatus, when the operator approaches a point on the display apparatus, change in voltage and/or current occurs in a circuit formed by the first and second scan lines at the point due to the capacitance caused by the operator. The location of the point can be determined by detecting the change in voltage and/or current.

The display apparatus and the electronic device according to embodiments of the present disclosure directly use the first and second scan lines for the display function as touch detection units for sensing a touch, without incorporating any additional touch sensing layer, and thus enables the touch operation function with the structure of a common display apparatus. This reduces manufacture cost, and meets the requirement of a thinner and lighter display.

The foregoing description is intended to illustrate the exemplary embodiments of the present disclosure. It will be readily understood by a person skilled in the art that various modifications and variations may be made to the present disclosure without departing from the spirit and scope of the present disclosure, and these modifications and variations also fall into the scope of the present disclosure.

What is claimed is:

1. A display apparatus, comprising:

a first driving layer comprising a plurality of first scan lines in parallel;

a second driving layer arranged in parallel to the first driving layer and comprising a plurality of second scan lines in parallel, wherein the first and second scan lines, when being projected to a plane, intersect with each other to form a grid;

a display layer arranged between the first and second driving layers and comprising a plurality of display units, each display unit having a first state and a second state different from the first state, wherein each of the display units is connected to a respective one of the first scan lines and a respective one of the second scan lines, and changes from the first state to the second state in response to a voltage difference between the respective ones of the first and second scan lines;

a first processing unit connected to the first and second scan lines and configured to, based on a content to be displayed, input a voltage to the first and second scan lines to cause at least one of the display units of the display layer to change from the first state to the second state;

a detection unit connected to the first and second scan lines and configured to detect a change in voltage and/or current of each of the first and second scan lines by:

detecting current differences between a current on each of the first scan lines and currents on the respective second scan lines, and current differences between a current on each of the second scan lines and currents on the respective first scan lines; or determining a first reference current for each of the first scan lines with respect to the respective second scan lines and a second reference current for each of the second scan lines with respect to the respective first scan lines, detecting a first current on each of the first scan lines with respect to the respective second scan lines and a second current on each of the second scan lines with respect to the respective first scan lines, and determining whether the first current on the first scan line is different from the corresponding first reference current and whether the second current on the second scan line is different from the corresponding second reference current; or obtaining an input time at which the voltage is inputted to the first and second scan lines, detecting, for each of the first scan lines, a first time at which a point on the first scan line reaches the input voltage, and for each of the second scan lines, a second time at which a point on the second scan line reaches the input voltage, and determining whether a difference between the first time corresponding to the first scan line and the input time is greater than a first predetermined time value and whether a difference between the second time corresponding to the second scan line and the input time is greater than the first predetermined time value; or detecting a first current on each of the first scan lines and recording a first time at which the first current is detected, detecting a second current on each of the second scan lines and recording a second time at which the second current is detected, and determining whether a difference between the first time corresponding to the first scan line and the second time corresponding to each of the second scan lines is greater than a second predetermined time value and whether a difference between the second time corresponding to the second scan line and the first time corresponding to each of the first scan lines is greater than the second predetermined time value; and a second processing unit connected to the detection unit and configured to, based on a result of the detection, take one of the first scan line having a change in voltage and/or current as a first contact lines, take one of the second scan lines having a change in voltage and/or current as a second contact line, determine an intersection between projection lines of the first and second contact lines in the first plane, and take the intersection as a touch position at which an operator touches the display apparatus.

2. An electronic device, comprising:

a first driving layer comprising a plurality of first scan lines in parallel;

a second driving layer arranged in parallel to the first driving layer and comprising a plurality of second scan lines in parallel, wherein the first and second scan lines, when being projected to a plane, form a plurality of first projection lines and a plurality of second projection lines, respectively, the first and second projection lines intersecting with each other to form a grid;

a display layer arranged between the first and second driving layers and comprising a plurality of display units, each display unit having a first state and a second state different from the first state, wherein each of the display units is connected to a respective one of the first scan line and a respective one of the second scan line, and changes from the first state to the second state in response to a voltage difference between the respective ones of the first and second scan lines;

a first processing unit connected to the first and second scan lines and configured to, based on a content to be displayed, input a voltage to the first and second scan lines to cause at least one of the display units of the display layer to change from the first state to the second state;

a detection unit connected to the first and second scan lines and configured to detect a change in voltage and/or current of each of the first and second scan lines by:
  detecting current differences between a current on each of the first scan lines and currents on the respective second scan lines, and current differences between a current on each of the second scan lines and currents on the respective first scan lines; or
  determining a first reference current for each of the first scan lines with respect to the respective second scan lines and a second reference current for each of the second scan lines with respect to the respective first scan lines, detecting a first current on each of the first scan lines with respect to the respective second scan lines and a second current on each of the second scan lines with respect to the respective first scan lines, and determining whether the first current on the first scan line is different from the corresponding first reference current and whether the second current on the second scan line is different from the corresponding second reference current; or
  obtaining an input time at which the voltage is inputted to the first and second scan lines, detecting, for each of the first scan lines, a first time at which a point on the first scan line reaches the input voltage, and for each of the second scan lines, a second time at which a point on the second scan line reaches the input voltage, and determining whether a difference between the first time corresponding to the first scan line and the input time is greater than a first predetermined time value and whether a difference between the second time corresponding to the second scan line and the input time is greater than the first predetermined time value; or
  detecting a first current on each of the first scan lines and recording a first time at which the first current is detected, detecting a second current on each of the second scan lines and recording a second time at which the second current is detected, and determining whether a difference between the first time corresponding to the first scan line and the second time corresponding to each of the second scan lines is greater than a second predetermined time value and whether a difference between the second time corresponding to the second scan line and the first time corresponding to each of the first scan lines is greater than the second predetermined time value;

a second processing unit connected to the detection unit and configured to, based on a result of the detection, take one of the first scan line having a change in voltage and/or current as a first contact line, take one of the second scan line having a change in voltage and/or current as a second contact line, determine an intersection between the first and second projection lines of the first and second contact lines in the first plane, and take the intersection as a touch position at which an operator touches the electronic device; and a responding unit configured to perform a touch operation corresponding to the touch position in response to the touch of the operator.

* * * * *